US007139861B2

(12) United States Patent
Lee

(10) Patent No.: US 7,139,861 B2
(45) Date of Patent: Nov. 21, 2006

(54) INPUT/OUTPUT UNIT ACCESS SWITCHING SYSTEM AND METHOD

(75) Inventor: Chun-Liang Lee, Taipei (TW)

(73) Assignee: Inventec Corporation, Taipei (TW)

( * ) Notice: Subject to any disclaimer, the term of this patent is extended or adjusted under 35 U.S.C. 154(b) by 235 days.

(21) Appl. No.: 10/667,074

(22) Filed: Sep. 18, 2003

(65) Prior Publication Data

US 2005/0066106 A1 Mar. 24, 2005

(30) Foreign Application Priority Data

Apr. 10, 2003 (TW) .............................. 92108198 A

(51) Int. Cl.
G06F 13/00 (2006.01)
G06F 3/01 (2006.01)
G06F 13/14 (2006.01)
G06F 13/12 (2006.01)
G06F 3/02 (2006.01)
G06F 13/22 (2006.01)

(52) U.S. Cl. ..................... 710/316; 710/38; 710/305
(58) Field of Classification Search ................ 710/316, 710/305, 38
See application file for complete search history.

(56) References Cited

U.S. PATENT DOCUMENTS

| | | | | |
|---|---|---|---|---|
| 5,721,842 | A * | 2/1998 | Beasley et al. | 709/204 |
| 5,884,096 | A * | 3/1999 | Beasley et al. | 710/38 |
| 6,304,895 | B1 * | 10/2001 | Schneider et al. | 709/203 |
| 6,378,009 | B1 * | 4/2002 | Pinkston et al. | 710/62 |
| 6,567,869 | B1 * | 5/2003 | Shirley | 710/62 |
| 6,578,140 | B1 * | 6/2003 | Policard | 713/1 |
| 6,654,241 | B1 * | 11/2003 | Hillyard et al. | 361/687 |
| 6,681,250 | B1 * | 1/2004 | Thomas et al. | 709/226 |
| 6,701,380 | B1 * | 3/2004 | Schneider et al. | 709/250 |
| 6,718,415 | B1 * | 4/2004 | Chu | 710/301 |
| 6,915,362 | B1 * | 7/2005 | Ramsey et al. | 710/62 |
| 6,931,475 | B1 * | 8/2005 | Huang et al. | 710/316 |
| 7,035,955 | B1 * | 4/2006 | Bobbitt et al. | 710/305 |

(Continued)

OTHER PUBLICATIONS

Intel Corporation; "Simplifying Complexity Blades Management in the Data Center"; Intel Corporation; Sep. 12, 2003.*

(Continued)

*Primary Examiner*—Rehana Perveen
*Assistant Examiner*—Ryan Stiglic
(74) *Attorney, Agent, or Firm*—Fulbright & Jaworski L.L.P.

(57) ABSTRACT

An I/O unit access switching system and its method are implemented on a plurality of servers respectively having a baseboard management controller (BMC) and an intelligent platform management system (IPMI). The servers are connected to a switching device, itself connected to a set of I/O devices such as keyboard, mouse, and monitor. When the control module of one server is activated, the BMC of the server delivers an activation signal to the switching device. According to the received activation signal, the switching device transmits an interrupt signal to the microprocessor unit. The microprocessor unit accordingly outputs a switching signal to an I/O function multiplexer that, in response, switches access to the I/O devices to the requesting server from which the activation signal was received. Through the I/O function multiplexer, the I/O devices can then be used in conjunction with the selected server.

13 Claims, 2 Drawing Sheets

U.S. PATENT DOCUMENTS

| | | | |
|---|---|---|---|
| 2002/0038334 A1* | 3/2002 | Schneider et al. | 709/203 |
| 2002/0124121 A1* | 9/2002 | Chen et al. | 710/38 |
| 2003/0051021 A1* | 3/2003 | Hirschfeld et al. | 709/223 |
| 2003/0131127 A1* | 7/2003 | King et al. | 709/238 |
| 2003/0222801 A1* | 12/2003 | Ying et al. | 341/26 |
| 2004/0073712 A1* | 4/2004 | Larson et al. | 709/249 |
| 2004/0098532 A1* | 5/2004 | Huang et al. | 710/316 |
| 2004/0199699 A1* | 10/2004 | Bobbitt et al. | 710/305 |
| 2004/0215617 A1* | 10/2004 | Ramsey et al. | 707/10 |
| 2005/0044184 A1* | 2/2005 | Thomas et al. | 709/219 |
| 2005/0050272 A1* | 3/2005 | Behrens et al. | 711/114 |

OTHER PUBLICATIONS

Intel Corporation; "Can a blade solve my compute server needs?"; Intel Corporation; Aug. 26, 2003.*

Intel Corporation; "Intel Server Chassis SBCE"; Intel Corporation; Sep. 21, 2003; available online at <http://web.archive.org/web/20030921080252/http://www.intel.com/design/servers/blades/SBCE>.*

Intel Corporation; "Intel Server Compute Blade SBXL52"; Intel Corporation; Sep. 21, 2003; available online at <http://web.archive.org/web/20030921081348/http://www.intel.com/design/servers/blades/SBXL52>.*

Intel Corporation; "Intel Server Management for Blades"; Intel Corporation; Sep. 21, 2003; available online at <http://web.archive.org/web/20030921081317/http://www.intel.com/design/servers/blades/SBCECMM>.*

Intel Corporation; "Intel Server Management Module SBCECMM: Installation and User's Guide"; Intel Corporation; Nov. 21, 2003.*

Intel Corporation; "Intel Server Compute Blade SBXL52: Hardware Maintenance Manual and Troubleshooting Guide"; Intel Corporation; Oct. 1, 2003.*

Intel Corporation; "Intel Server Chassis SBCE: Installation and User's Guide"; Intel Corporation; Oct. 6, 2003.*

Phillips Semiconductors; "the 12C-Bus Specification Version 2.1"; Phillips Semiconductors; Jan. 2000.*

* cited by examiner ic # INPUT/OUTPUT UNIT ACCESS SWITCHING SYSTEM AND METHOD

BACKGROUND OF THE INVENTION

1. Field of the Invention

The invention relates to input/output (I/O) unit access switching systems and methods, and more particularly, to a system and a method which enable switching access to I/O devices between computer servers supporting an intelligent platform management interface (IPMI).

2. Description of the Related Art

Keyboard, video, and mouse (KVM) switches are used to connect several computers or servers to a set of input/output (I/O) devices (i.e. keyboard, mouse, and monitor), so that the same set of I/O devices can be used for each computer or server via switching their respective I/O signals.

KVM switches have the advantages of reducing equipment cost, decreasing power consumption, and conserving space. In addition, users provided with KVM switches no longer need to move from place to place in order to access computers or servers that are installed at different locations.

However, the KVM switches currently known in the art necessitate the provision of keyboard and mouse signals to each computer or server connected to the KVM switches. Therefore, the number of output connections of the KVM switch is high, particularly for KVM switches for blade servers where a large number of servers are stacked in racks. Due to the increase in the number of output connections, the functions, and, in particular, the operations of the microprocessor unit of the KVM switch are negatively affected. Therefore, a need exists for a system that can reduce the number of output connections required for the KVM switch which does not adversely affect the operations of the microprocessor unit inside the KVM switch.

SUMMARY OF THE INVENTION

It is therefore an objective of the invention to provide an I/O unit access switching system and an associated method that can be implemented in a KVM switch to which a plurality of computers or servers are connected. The access switching system and method of the invention should be capable of overcoming the above disadvantages by eliminating the need of separate connections between the keyboard/mouse signal lines of each computer/server and the KVM switch. The number of signal pins needed by the KVM switch is thereby reduced.

It is another objective of the invention to provide an I/O unit access switching system and an associated method that can be implemented in a KVM switch to which a plurality of computers or servers are connected, in such a manner that the number of connections to the computers/servers does not adversely affect the performance of the microprocessor unit inside the KVM switch.

To achieve these and other objectives, an I/O unit access switching system of the invention comprises at least an input device and an output device, a plurality of servers respectively including a control module and a baseboard management controller (BMC) used as an intelligent platform management interface (IPMI), and a switching device. The switching device further comprises a microprocessor unit, an input function switching unit connected to the micropro cessor unit and each BMC, an output function switching unit respectively connected to the microprocessor unit and each server, an interrupt unit connected to the microprocessor unit and each BMC, at least a set of input connection ports connected to the microprocessor and the input device, and at least a set of output connection ports connected to the microprocessor unit and the output device. When the control module of one server is activated, the BMC of the corresponding server outputs an interrupt request signal to the interrupt unit of the switching device. The interrupt unit accordingly determines the server from which the interrupt request signal has been delivered, and transmits this result to the microprocessor unit. Consequently, the microprocessor unit respectively generates an input switch request signal that is transmitted to the input function switching unit, and an output switch request signal that is transmitted to the output function switching unit. According to the switch request signals, both the input function switching unit and the output function switching unit then generate and transmit switch driving signals to the BMC of the corresponding server where the control module has been activated. The corresponding server can then receive, through the BMC, the input function switching unit, and the input connection ports, the user input signals from the input device, and, consequently, execute the corresponding operations. Through the output function switching unit and the output connection ports, the server can further output the results of operations to the output device.

According to the invention, the I/O unit access switching method is implemented on servers supporting IPMI. Further, the servers are respectively connected to a switching device, itself connected to an I/O device. Through the switching device, the access to the I/O device can be switched between the different servers. The access switching method of the invention comprises the following steps:

(1) The switching device determines whether a server transmits a request for access to the I/O device, if yes then go to step (2), otherwise return to step (1);

(2) According to the received access request, the switching device generates a corresponding interrupt signal that is transmitted to the microprocessor unit; the microprocessor unit consequently generates a switching signal that is transmitted to an I/O function multiplexer; and (3) According to the switching signal, the I/O function multiplexer switches access of the I/O devices to the requesting server; the requesting server therefore is enabled to use the I/O devices through the I/O function multiplexer; then return to step (1).

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
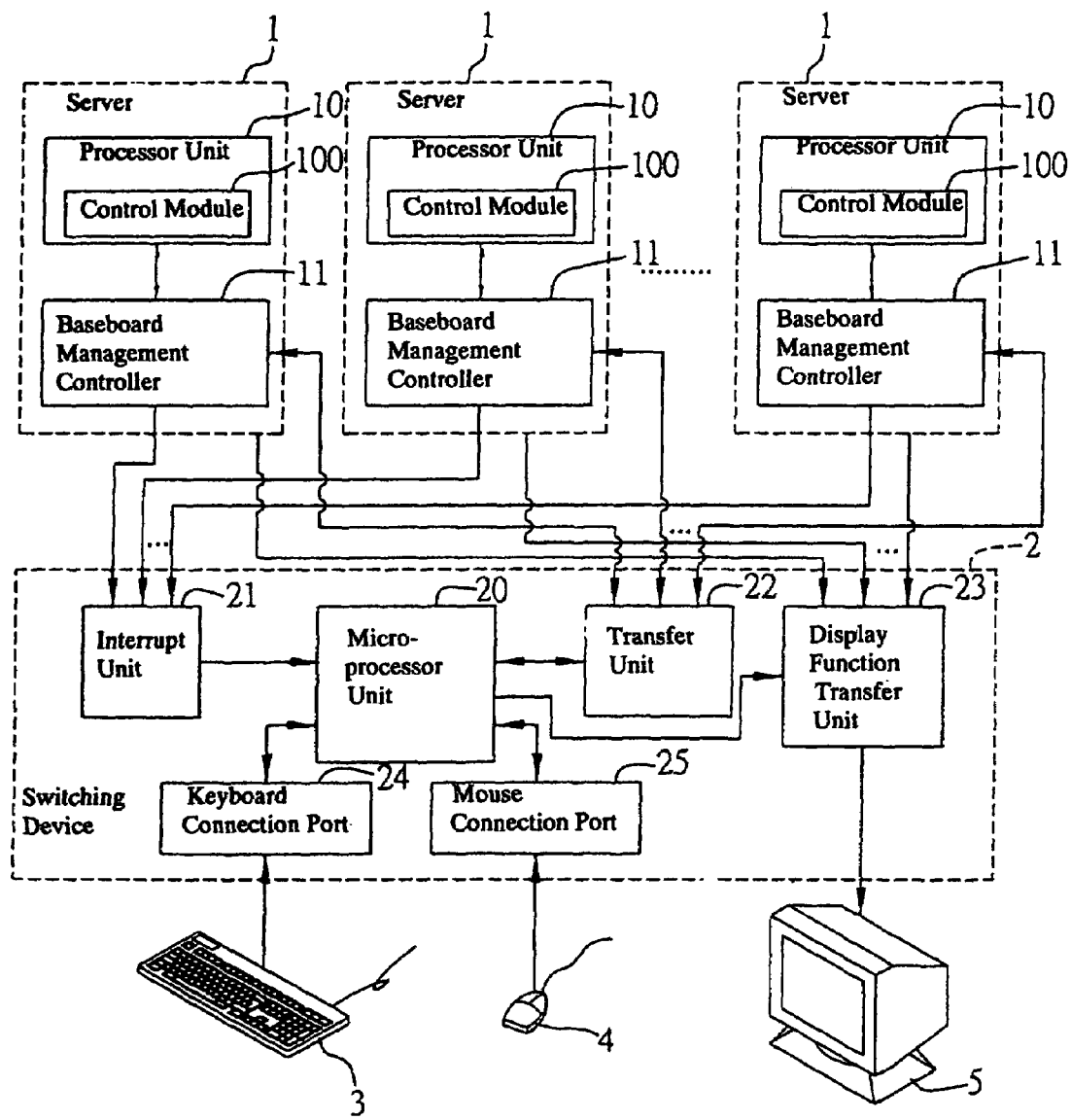
FIG. 1 is a block diagram of an I/O unit access switching system according to an embodiment of the invention.

Wherever possible in the following description, like reference numerals will refer to like elements and parts unless otherwise illustrated.

FIG. 1 is a block diagram illustrating an input/output (I/O) unit access switching system according to an embodiment of the invention. As illustrated, an I/O unit access switching system according to this embodiment includes a plurality of servers 1, a switching device 2 connected to the servers 1, a keyboard 3 connected to the switching device 2, a mouse 4 connected to the switching device 2, and a monitor 5 connected to the switching device 2. Any of the servers 1 has access to the keyboard 3, the mouse 4, and the monitor 5 for utilization under control of the switching device 2, so that a system manager is enabled to control the network environment.

Each of the servers 1 includes a processor unit 10 having a control module 100, and a baseboard management controller (BMC) 11 connected to the processor unit 10. The switching device 2 comprises a microprocessor unit 20, an interrupt unit 21 respectively connected to the microprocessor unit 20 and each BMC 11, a control transfer unit 22 respectively connected to the microprocessor unit 20 and each BMC 11, a display function transfer unit 23 respectively connected to the microprocessor unit 20 and the servers 1, a keyboard connection port 24 respectively connected to the microprocessor unit 20 and, externally, to the keyboard 3, and a mouse connection port 25 respectively connected to the microprocessor unit 20 and, externally, to the mouse 4.

The processor unit 10 of each server 1 includes at least a central processor and system software (not shown). The central processor is the core element of the server performing calculation and executing the specific functions provided by the system software to provide services to the user. The processor unit 10 of the server 1 involves a technology known in the art and its description is therefore omitted herein. The control module 100 is, for example, a switch (not shown); when the user wants one of the servers 1 to use the keyboard 3, the mouse 4, and the monitor 5, he/she activates the control module 100 to produce a select signal which is then transmitted to the BMC 11 by the processor unit 10.

The BMC 11 of each server 1 is the core of an intelligent platform management interface (IPMI), and it is used as an intelligent interface between the management software of the control system and the platform management hardware, and typically provides autonomous monitoring, event recording, and restoration control functions. The BCM 11 is a known structure within an IPMI framework and its description therefore is not detailed herein. Upon receiving a select signal from the processor unit 10, the BMC 11 accordingly generates an interrupt signal corresponding to the server 1 just selected, transmitting the interrupt signal to the interrupt unit 21 of the switching device 2.

The microprocessor unit 20 is the core of the switching device 2, and is used to manage the respective operations of the interrupt unit 21, the control transfer unit 22, the display function transfer unit 23, the keyboard connection port 24 and the mouse connection port 25 connected to the switching device 2. Through switching device 2, any of the servers 1 can thereby have access to the keyboard 3, the mouse 4, and the monitor 5.

Upon receiving an interrupt signal from the BMC 11, the interrupt unit 21 determines whether it corresponds to an interrupt signal from one of the BMC 11 units for switching access to the keyboard 3, the mouse 4, or the monitor 5. The interrupt unit 21 then forwards the interrupt signal to the microprocessor unit 20 which according to the transmitted interrupt signal, transfers the respective operating right for the keyboard 3, and mouse 4, respectively connected to the keyboard connection port 24 and mouse connection port 25. Likewise, the microprocessor unit 20, through the display function transfer unit 23, transfers the operating right of the monitor 5 to a corresponding server 1 for which the control module 100 was activated.

The control transfer unit 22 is, for example, an I2C-compatible multiplexer (not shown). Therefore, the control transfer unit 22 may be connected to the BMC 11 of each server 1 via a connection circuit compatible with the I2C transmission interface. A general purpose multiplexer (not shown) may be used as the display function transfer unit 23.

Figure 2:
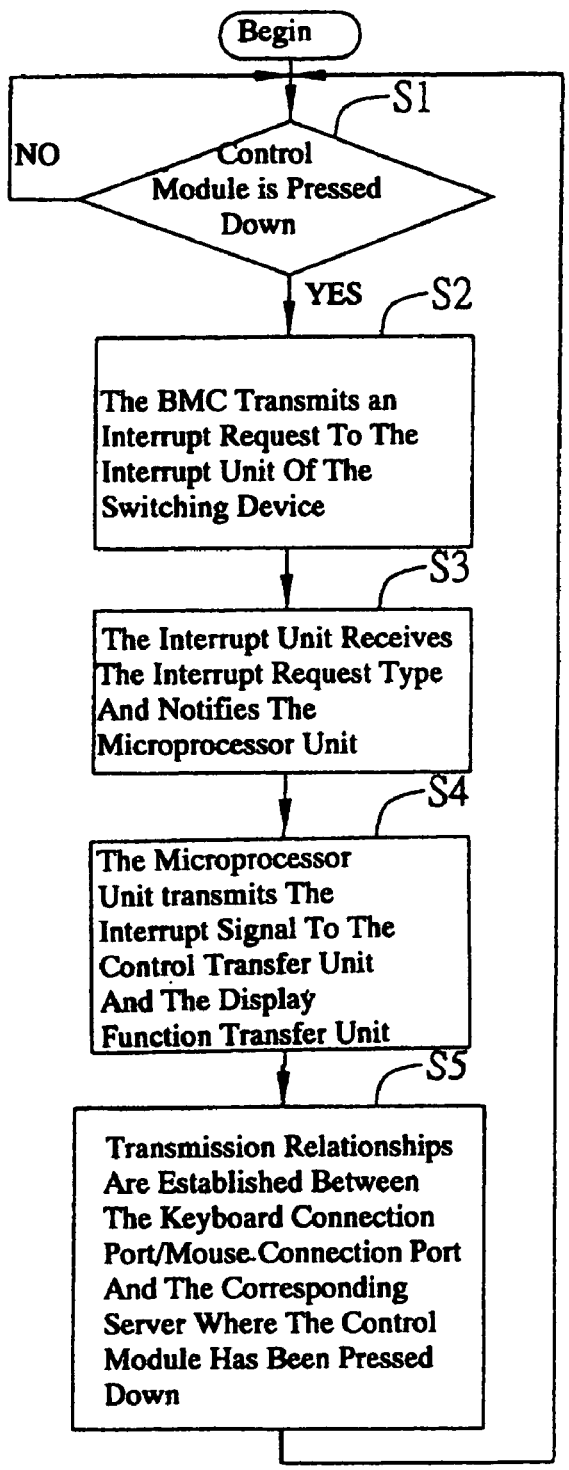
FIG. 2 is a flow chart illustrating an I/O unit access switching method implemented according to an embodiment of the invention.

Referring to FIG. 2, the flow chart schematically illustrates a switching method designed to switch the access right to an I/O unit according to an embodiment of the invention. The illustrated switching method may be implemented in, for example, the switching system described in FIG. 1. At step S1, a determination is first made as to whether the control module 100 of any of the servers 1 was activated. If one of the control modules 100 was activated, step S2 is executed, otherwise return to step S1.

At step S2, based on the received select signal, the BMC 11 of the corresponding server 1 (where the control module was activated) generates an interrupt signal corresponding to that particular server 1. This interrupt signal is then transmitted to the interrupt unit 21 of the switching device 2. Step S3 is then executed.

At step S3, the interrupt unit 21 determines whether the interrupt signal is a signal for switching the access to the keyboard 3, mouse 4, and monitor 5, transmitting the interrupt signal to the microprocessor unit 20 if it does correspond to a request to access these devices. Step S4 then is executed.

At step S4, after the microprocessor unit 20 of switching device 2 has received the interrupt signal, a corresponding signal is transmitted to the control transfer unit 22 and display function transfer unit 23. Step S5 then is executed.

At step S5, through the microprocessor unit 20 and the control transfer unit 22, access relationships are established between the keyboard connection port 24, mouse connection port 25, and the corresponding server 1 where the control module 100 was activated. Keyboard and mouse signals then are transmitted through the I2C transmission interface between the control transfer unit 22 of the switching device 2 and the BMC 11 of the server 1. The keyboard 3 and the mouse 4, respectively connected to the switching device 2, can then be used as input devices for the selected server 1. The processor unit 10 of the server 1 can then receive input signals transmitted from the keyboard 3 and mouse 4 under manipulation by the user. Similarly, through the microprocessor unit 20 and the display function transfer unit 23, transmission relationships are established between the monitor 5 and the corresponding server 1 where the control module 100 was activated. The monitor 5, connected to the switching device 2, can then display video corresponding to the user's actions as processed by the processor unit 10 of the corresponding server 1. Subsequently, the executed method returns to step S1, in which switching device 2 continues to check whether the control module 100 of another server 1 has been activated; if yes, then steps S2~S5 are re-executed to switch access to the keyboard 3, mouse 4, and monitor 5 to another server 1.

As described above, in the access switching system and implementation method for I/O devices according to the invention, the servers thereof use the BMC provided by the IPMI framework as the control core of the I/O unit. Through connections with a switching device, I/O devices, such as a keyboard, a mouse, and a monitor, can have their access switched as desired to any server. As a result, the switching system/method of the invention enables a considerable reduction of the number of I/O signal pins (such as keyboard and mouse) usually needed between the switching device and the servers, without affecting the switching functions.

It should be apparent to those skilled in the art that the above description is only illustrative of specific embodiments and examples of the invention, and should not be construed in a limiting way. For example, besides the use of separate I2C transmission interfaces for signal transmission between the control transfer unit of the switching device and the BMC of each server, a common I2C transmission interface may be used to transmit keyboard and mouse signals in an alternative embodiment. Therefore, the invention should cover various modifications and variations made to the herein-described structure and operations of the invention, provided they fall within the scope of the invention as defined in the following appended claims.

What is claimed is:

1. An input/output (I/O) unit access switching system, comprising:
    a plurality of servers each comprising a control module and an intelligent platform management interface (IPMI) having a baseboard management controller (BMC);
    at least one input device;
    at least one output device; and
    a switching device comprising a microprocessor unit, an input function switching unit connected to the microprocessor unit and each of the BMCs, an output function switching unit connected to the microprocessor unit and each of the servers, an interrupt unit connected to the microprocessor unit and each of the BMCs, at least one set of input connection ports connected to the microprocessor unit and the input device, and at least one set of output connection ports connected to the microprocessor unit and the output device;
    wherein when the control module of one of the servers is activated, the BMC of the corresponding server outputs an interrupt request signal to the interrupt unit of the switching device, so as to allow the interrupt unit to determine if the interrupt request signal is transmitted from the server whose control module is activated, and to forward the determination result to the microprocessor unit, whereby the microprocessor unit generates an input switch request signal that is transmitted to the input function switching unit, and generates an output switch request signal that is transmitted to the output function switching unit, such that according to the input and output switch request signals respectively, the input function switching unit and the output function switching unit each generates and transmits a corresponding switch driving signal to the BMC of the server whose control module is activated, and such that this server who receives the switch driving signals is allowed to receive an input signal from the input device through the corresponding BMC, the input function switching unit and the input connection ports, and to consequently execute operations according to the input signal, as well as to output the operational result to the output device through the output function switching unit and the output connection ports.

2. The I/O unit access switching system of claim 1, wherein the input connection port is connected to a keyboard or mouse.

3. The I/O unit access switching system of claim 1, wherein the output connection port is connected to a monitor.

4. The I/O unit access switching system of claim 1, wherein the control module is a switch.

5. The I/O unit access switching system of claim 1, wherein the input function switching unit is a multiplexer supporting an I2C transmission interface.

6. The I/O unit access switching system of claim 1, wherein the output function switching unit is a multiplexer.

7. The I/O unit access switching system of claim 1, wherein the input function switching unit and the BMC of each of the servers transmit input signals from the input connection ports through an I2C transmission interface, so as to allow the server whose control module is activated to receive the input signal from the input device.

8. An input/output (I/O) unit access switching method for use with a plurality of servers each comprising an intelligent platform management interface (IPMI) having a baseboard management controller (BMC), the servers being connected to a switching device that is coupled to a set of I/O devices so as to allow the servers to access switching operations of the I/O devices through the switching device, the method comprising the steps of:
    (1) determining via the switching device if a request for access to the I/O devices is sent from one of the servers; if yes, proceeding to step (2); if no, returning to step (1);
    (2) forwarding the request for access to the I/O devices via the BMC of the corresponding server to the switching device;
    (3) according to the received request for access, generating via the switching device a corresponding interrupt signal that is transmitted to a microprocessor unit of the switching device, so as to allow the microprocessor unit to consequently generate a switching signal that is transmitted to an I/O function multiplexer of the switching device; and
    (4) according to the switching signal, providing via the I/O function multiplexer the access to the I/O devices for the server who sends the request for access, to allow this server to operate the I/O devices through the I/O function multiplexer; then returning to step (1).

9. The I/O unit access switching method of claim 8, wherein each of the servers has a control module for generating the request for access to the I/O devices.

10. The I/O unit access switching method of claim 9, wherein the control module is a switch.

11. The I/O unit access switching method of claim 8, wherein the I/O function multiplexer is connected to the servers through an I2C transmission interface.

12. The I/O unit access switching method of claim 8, wherein the I/O devices include an input device that is a keyboard or mouse.

13. The I/O unit access switching method of claim 8, wherein the I/O devices include an output device that is a monitor.

* * * * *